June 13, 1972     J. G. McDEVITT     3,669,817
REVERSIBLE FLOORING
Filed March 16, 1970

INVENTOR
JAMES G. McDEVITT
BY
Hauke Gifford & Patalidis
Attorneys

United States Patent Office 3,669,817
Patented June 13, 1972

3,669,817
REVERSIBLE FLOORING
James G. McDevitt, 117 N. Adelaide,
Fenton, Mich. 48430
Filed Mar. 16, 1970, Ser. No. 19,915
Int. Cl. B60r 27/00
U.S. Cl. 161—44    11 Claims

ABSTRACT OF THE DISCLOSURE

A flooring for use within an automobile or the like consisting of a carpet material bonded to a fiberboard material, the two bonded materials being cut to a rectilinear shape, and being adapted to be disposed in a horizontal position on the permanent floor of a vehicle without interfering with the side wall structure of the vehicle. The bonded materials form a flooring which may be selectively reversed from one surface to the other depending upon its required use within the automobile.

BACKGROUND OF THE INVENTION

(I) Field of the invention

The present invention relates to floors for automobiles and the like, and in particular relates to a reversible removable floor for automotive station wagons.

(II) Description of the prior art

Heretofore, vehicles, such as automotive station wagons, had a rear section which was adapted to carry luggage and other materials which are generally too large to be conveniently carried in a standard automobile trunk. Initially, such automotive station wagons have had a floor which was generally constructed of a metallic material, such as sheet metal. Although such metallic floorings have functioned in a satisfactory manner, the rear luggage carrying section of such station wagons has in recent years been used to transport persons. Thus, automotive manufacturers have manufactured such station wagons with a carpeted rear section that function in a perfectly acceptable manner in carrying passengers as the same afford a decorative interior for the passengers and especially provide a smooth surface for children to sit on when the same are carried in the rear section of such station wagons. Although the use of a carpeted rear section facilitates the carrying of passengers, such permanently carpeted floors deteriorate rather rapidly when the same automotive station wagon is utilized to carry luggage or other materials, and particularly when such automotive station wagons are used to carry equipment of the type which may soil or tear or otherwise damage the carpeted surface.

It would therefore be desirable to provide a flooring for such automotive station wagons and the like which provides a carpeted surface when such rear section is used for the carrying of passengers; while at the same time being so constructed as to be able to provide a relatively smooth and hard flooring when the same rear section is being used to carry equipment which would normally cause damage to a carpeted surface.

It would also be desirable to provided a flooring of the type hereinbefore described which would be very simple and inexpensive in its manufacture and so constructed that it is adapted for use in both new and used automotive station wagons.

SUMMARY OF THE INVENTION

The present invention, which will be described subsequently in greater detail, comprises a reversible removable flooring for vehicles and particularly automotive station wagons. The flooring comprises a flat sheet of a hard but flexible material cut to a rectilinear shape on which a carpeted material of the same shape is bonded. The two bonded materials are adapted to be disposed in a horizontal position on the permanent flooring of automotive station wagons, the opposite surfaces of the bonded material both being adapted to function as the exposed flooring depending upon what is to be carried thereon.

It is therefore an object of the present invention to provide a reversible flooring adapted to use in automotive station wagons and the like which will function in an acceptable manner when the automotive vehicle is being utilized to carry either passengers, luggage, equipment or the like.

Other objects, advantages and application of the present invention will become apparent to those skilled in the art of such flooring construction when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts and in which.

DESCRIPTION OF THE PREFERRED EMBODIMENT

Figure 1:
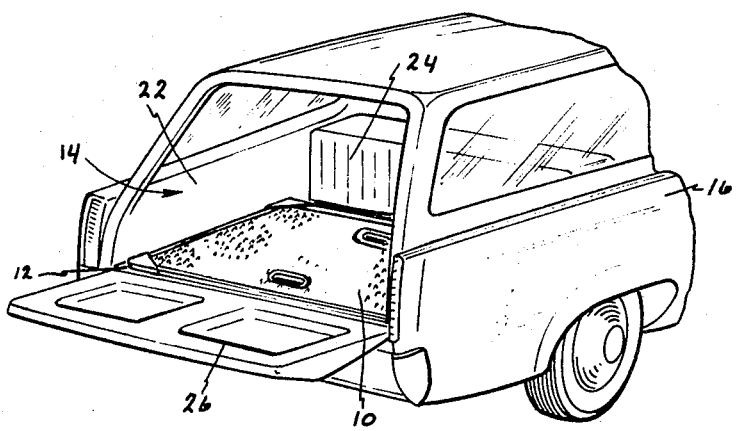
FIG. 1 is a perspective view of a reversible flooring shown in position in a rear section of an automotive station wagon.

Referring now to the drawing wherein there is illustrated one example of the present invention in the form of a reversible flooring 10 disposed on the permanent floor 12 within the rear section 14 of an automotive station wagon 16.

The flooring 10 comprises a carpet material 18 attached to one surface of a flat hard, but flexible, sheet of material 20, preferably a sheet of fiberboard material. Although a sheet of fiberboard material is preferred, it should be noted that other materials, such as a hard flexible plastic, plywood or a metallic material may be used in place of the sheet of fiberboard material 20. The carpet material 18 is similar to the carpet material presently used in automotive vehicles, however other soft cushioning materials may be used in lieu of the material 18. The carpet material 18 is attached to the sheet of fiberboard material 20 by any suitable adhesive or bonding agent, although the two materials may be joined by any suitable means, such as by tacking.

The joint sheets of the carpet material 18 and fiberboard material 20 are cut preferably in a rectilinear shape having a length and width generally following the contour of the rear section 14 of the particular automotive station wagon 16 in which the flooring 10 is to be used and of such a width so as not to interfere with the sidewall structure 22 of the vehicle frame and the rear seat 24 and rear door 26 thereof. In most applications, the flooring 10 may be of a simple rectilinear shape. In the preferred embodiment, the finished flooring 10 will have a thickness of approximately .35 inch, which will provide a sufficient thickness such that the flooring has sufficient strength to sustain the weight of the passengers and/or items that may be placed upon it during use. In addition, the use of the carpeting and fiberboard materials results in a lightweight construction, providing ease of handling when it is desired to reverse the flooring 10 in a manner which will be described in greater detail hereinafter.

The perimeter of the flooring 10 has a border 28 which, in addition to adding to the aesthetic appearance of the flooring 10 by concealing the exposed edges thereof, protects the outer edge of the flooring 10 and insures that the carpet material 18 will stay bonded to the fiberboard material 20 proximate the edge thereof. As can be best seen in FIGS. 2 and 3, the border 28 comprises a channel-shaped member 30 having a U-shaped cross section which is positioned over the carpet material 18 and fiberboard material 20 and has sufficient resiliency to insure that the same remains attached to the edge of the joined surfaces. In the preferred embodiment, the border material is fabricated from a plastic material, however other suitable materials may also be used.

Figure 2:
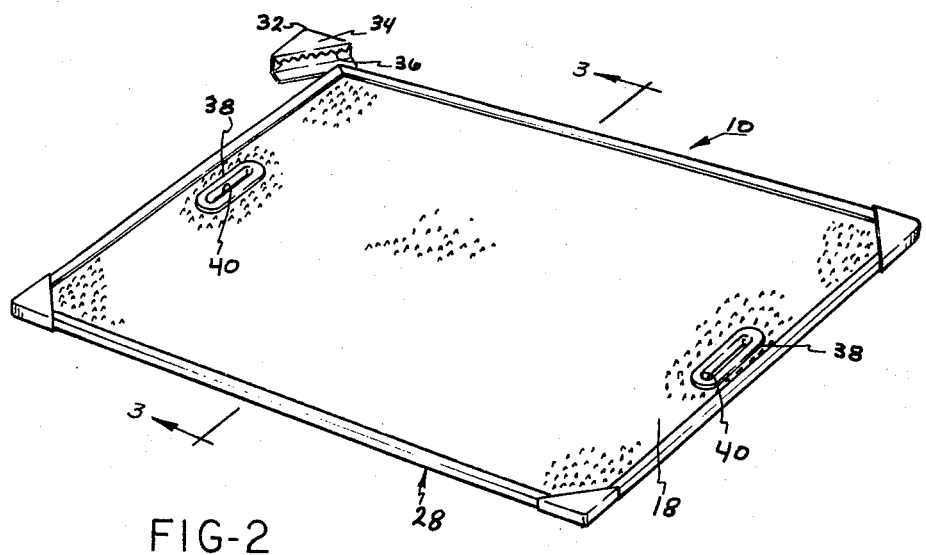
FIG. 2 is a perspective view of the flooring illustrated in FIG. 1.
Figure 3:
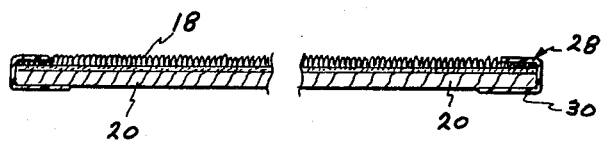
FIG. 3 is a fragmentary cross-sectional view of the flooring illustrated in FIG. 2 and taken along line 3—3 thereof.

As can be best seen in FIG. 2, each corner of the flooring 10 is provided with a clamping element 32 of such a construction that the same is adapted to fit over each corner of the flooring 10. The upper face 34 of the clamping element 32 has downwardly extending teeth 36 which engage the surface of the carpet material 18 so as to provide a means for maintaining the clamping elements 32 in place. The clamping elements 32 perform a two-fold function: first, they aid in maintaining the borders 28 attached to the edges of the flooring 10; and secondly, the clamping elements protect the corners of the flooring 10 which are generally subjected to greater wear when the flooring 10 is reversed, as will be explained hereinafter. The clamping elements 32 are preferably constructed from a metallic material, however other suitable materials may be used, such as a plastic material or the like.

As can best be seen in FIG. 2, apertures 38 extending completely through the flooring 10 are provided at opposite ends thereof. The purpose of the apertures 38 is to permit the user of the flooring to grasp the same in a convenient manner so as to withdraw the flooring 10 from the rear section 14 of the automotive station wagon 16, and thus the apertures 38 function as a simple handle to permit the easy use of the flooring 10. The apertures 38 have a channel-shaped border 40 similar to the border 28 disposed about the edge of the flooring 10. The user of the reversible flooring 10 will have either the surface of the carpet material 18 or of the fiberboard material 20 exposed depending upon how the rear section 14 of the automotive station wagon 16 is to be used. If passengers are to be carried in the rear section 14, the flooring 10 is inserted into the rear section 14 and such that the carpet material 18 is upright and exposed, thus the rear section has a carpeted flooring which small children may sit on if desired, and in which the aesthetic appearance of the rear section 14 is immensely improved over the standard metal flooring normally provided by the manufacturers of such automotive station wagons. If the operator of the vehicle 16 desires to transport goods or equipment of such a nature which might possibly tear or otherwise damage the carpet material 18, the flooring 10 may be removed from the vehicle, reversed and replaced upon the permanent flooring 12 of the vehicle 16 such that the carpet material 18 abuts the permanent flooring 12 and the fiberboard surface 20 is upright and exposed. Thus, the equipment may be placed on the hard fiberboard material 20 without concern of damaging the fiberboard material 20 or soiling or otherwise damaging the carpet material 18.

It can thus be seen that the present invention has provided a removable reversible flooring particularly adapted for use in automotive station wagons which is very simple to use, which provides a means of having an attractive rear section while at the same time providing a means for the operator of the automotive station wagon to carry equipment and the like without the danger of soiling the carpeting as would be the case if the permanent flooring of the vehicle was permanently carpeted.

It can also be seen that the present invention has provided a reversible flooring which is very simple in its construction and very inexpensive to manufacture; and, thus, if the operator of the vehicle utilizing such a flooring construction does wear the same, it may be replaced very inexpensively.

While the form of the embodiment of the present invention as herein disclosed constitutes a preferred form, it is to be understood that other forms may be adopted, all coming within the scope and spirit of the claims which follow.

What is claimed is as follows:

1. A readily removable reversible station wagon flooring comprising:

a first flat sheet having a rectilinear shape and formed of a hard material;

a second flat sheet formed from a unitary carpet material, said second sheet having substantially the same rectilinear shape as said first sheet, said first and second sheet being attached to form said flooring, the nap of said carpet material being exposed when said sheets are attached;

means for attaching said first sheet to said second sheet to form said flooring;

said attached rectilinearly shaped sheets having a length and width generally following the contour of said rear section of a station wagon in which said flooring is adapted to be used and of such a length and width as not to interfere with the sidewall structure, the rear seat, and rear door of said station wagon; and the opposing edges of said flooring being spaced predetermined distances to permit the insertion and withdrawal of said flooring respectively into and from a horizontal disposition on the permanent floor in the rear of said station wagon without interference with the interior wall structure of said station wagon, whereby the exposed surfaces of said attached flat sheets are adapted to be selectively used as the upper exposed surface of a removable flooring in said station wagon.

2. The flooring as defined in claim 1, wherein said second flat sheet comprises a unitary uninterrupted carpet element adhesively and permanently secured to said one surface of said first sheet.

3. The flooring as defined in claim 2, wherein said first flat sheet is made of a fiberboard material.

4. The flooring as defined in claim 2 including a border member carried by said attached sheets about the perimeter thereof to conceal the joined edges of said sheets.

5. The flooring as defined in claim 4 including means attached to the corners of said adjoined sheets to protect said corners.

6. The floor as defined in claim 5, wherein said corner means comprise a relatively rigid material having teeth on one surface thereof to cooperate with said carpet material to prevent removal of said corner means from said flooring.

7. The flooring as defined in claim 4 including handle means carried by said flooring to permit the easy removal of said flooring from within said vehicle.

8. The flooring as defined in claim 7, wherein said handle means comprises an aperture extending through said flooring at a point proximate one edge thereof.

9. A removable reversible flooring for a station wagon comprising:

a first flat sheet having a rectilinear shape and formed from a fiberboard material;

a second flat sheet formed from a unitary carpet material, said second sheet having substantially the same rectilinear shape as said first sheet;

means for attaching one flat surface of said first sheet to one flat surface of said second sheet such that the nap of said carpet is exposed;

the opposing edges of said floor being spaced predetermined distances to permit the insertion and withdrawal of said flooring in a horizontal disposition on the permanent floor of the rear of said station wagon without interference with the interior wall structure of said station wagon to permit selective exposure of either surface of said flooring in said station wagon;

a protective U-shaped border, the base of which abuts the edges of said attached sheets and the legs of said border overlying a portion of the exposed surfaces of said sheets adjacent said edges; and a plurality of corner guards, each comprising a pair of connecting, triangularly shaped sides defining a cavity thereinbetween within which one corner of said flooring is received, said sides of each corner guard overlying the protective U-shaped border and the opposite sides of said sheets adjacent each corner of said flooring, the side of each of said guards on the nap side of said flooring having inwardly extending teeth adapted to engage said carpet nap for securing said corner guards in place.

10. The flooring defined in claim 9 further comprising apertures extending through said flooring at points proximate opposing edges thereof to define a pair of handles to permit easy removal and insertion of said flooring into and from said station wagon.

11. A readily removable reversible station wagon flooring comprising:

a first flat sheet having a rectilinear shape and formed of a hard material;

a second flat sheet formed from a unitary carpet material, said second sheet having substantially the same rectilinear shape as said first material, said first and second sheets being attached to form said flooring, the nap of said carpet material being exposed when said sheets are attached;

means for attaching said first sheet to said second sheet, said attached rectilinearly shaped sheets having a length and width generally following the contour of the rear section of a station wagon in which said flooring is adapted to be used and of such a length and width as not to interfere with the sidewall structure, the rear seat, and rear door of said station wagon;

the opposing edges of said flooring being spaced predetermined distances to permit the insertion and withdrawal of said flooring respectively into and from a horizontal disposition on the permanent floor in the rear of said station wagon without interference with the interior wall structure of said station wagon, whereby the exposed surfaces of said attached flat sheets are adapted to be selectively used as the upper exposed surface of a removable flooring in said station wagon; and a protective U-shaped border, the base of which abuts the side edges of said attached sheets, and the legs of said border overlying a portion of the exposed surfaces of said attached sheets adjacent said sheet edges.

References Cited
UNITED STATES PATENTS

| | | | |
|---|---|---|---|
| 1,998,781 | 4/1935 | Jackson | 161—64 X |
| 1,552,852 | 9/1925 | Innes | 161—44 |
| 3,323,151 | 6/1967 | Lerman | 5—344 X |
| 1,007,301 | 10/1911 | McHenry | 161—44 X |
| 1,880,785 | 10/1932 | Card | 161—44 |
| 2,760,895 | 8/1956 | Holgerson | 161—64 X |

JOHN T. GOOLKASIAN, Primary Examiner

J. C. GIL, Assistant Examiner

U.S. Cl. X.R.

5—344; 49—460; 108—13; 161—41, 64, 109; 296—1 F